(12) United States Patent
Kaburagi et al.

(10) Patent No.: US 6,221,814 B1
(45) Date of Patent: Apr. 24, 2001

(54) AQUEOUS COMPOSITIONS, AQUEOUS CUTTING FLUID USING THE SAME, METHOD FOR PREPARATION THEREOF, AND CUTTING METHOD USING THE CUTTING FLUID

(75) Inventors: Shingo Kaburagi; Akio Ashida, both of Tokyo; Etsuo Kiuchi, Gunma-ken, all of (JP)

(73) Assignees: Shin-Etsu Handotai Co., Ltd.; Ohtomo Chemical Ind., Corp., both of Tokyo (JP)

( * ) Notice: Subject to any disclaimer, the term of this patent is extended or adjusted under 35 U.S.C. 154(b) by 0 days.

(21) Appl. No.: 09/423,316

(22) PCT Filed: Apr. 9, 1999

(86) PCT No.: PCT/JP99/01895

§ 371 Date: Nov. 12, 1999

§ 102(e) Date: Nov. 12, 1999

(87) PCT Pub. No.: WO99/54427

PCT Pub. Date: Oct. 8, 1999

(30) Foreign Application Priority Data

Apr. 21, 1998 (JP) ................................................. 10-128268

(51) Int. Cl.⁷ ....................... C10M 173/02; C10M 125/26
(52) U.S. Cl. ........................... 508/136; 508/143; 508/144; 508/583
(58) Field of Search ................................. 508/136, 143, 508/144, 583

(56) References Cited

U.S. PATENT DOCUMENTS 3,909,424 * 9/1975 Clark ...................................... 508/136
4,655,951 * 4/1987 Hanazaki et al. ..................... 508/136
4,664,679 * 5/1987 Kohyama et al. ....................... 51/308
5,045,519 * 9/1991 Meyer et al. .......................... 502/235
5,349,149 * 9/1994 Shiraki et al. ........................ 508/583

FOREIGN PATENT DOCUMENTS 1 229 803    4/1971  (GB) .
3-181598     8/1991  (JP) .
10-259396    9/1998  (JP) .

* cited by examiner

Primary Examiner—Ellen M. McAvoy
(74) Attorney, Agent, or Firm—Arent Fox Kintner Plotkin & Kahn, PLLC

(57) ABSTRACT

An aqueous cutting fluid which can reduce the impact on working environment and the global environment, and can achieve both preventing precipitates from becoming a hard cake and keeping high dispersibility for abrasive grains is provided. Such an aqueous cutting fluid is obtained by a method comprising dispersing abrasive grains (G) in an aqueous composition comprising a dispersion medium (M) containing a hydrophilic alcohol compound such as ethylene glycol, a lipophilic alcohol compound such as propylene glycol and water, and silica colloid particles dispersed stably in the medium. The dispersion medium (M) is odorless and not flammable. The abrasive grains (G) may settle out after a time, but they do not closely contact with one another, and therefore the resulting precipitates do not become a hard cake, which allows the re-dispersion and reuse of precipitated grains. The instant aqueous cutting fluid is inherently low viscous, and the reduction of viscosity owing to the contamination of water and the increase of viscosity owing to contamination of shavings are both moderate. As a result, the cutting fluid has a long life. And articles which have been cut using the cutting fluid can be washed with water. Further, as the dispersion medium (M) is a biodegradable low molecular weight organic compound, a waste liquid from a process using the cutting fluid can be disposed with an activated sludge.

10 Claims, 5 Drawing Sheets

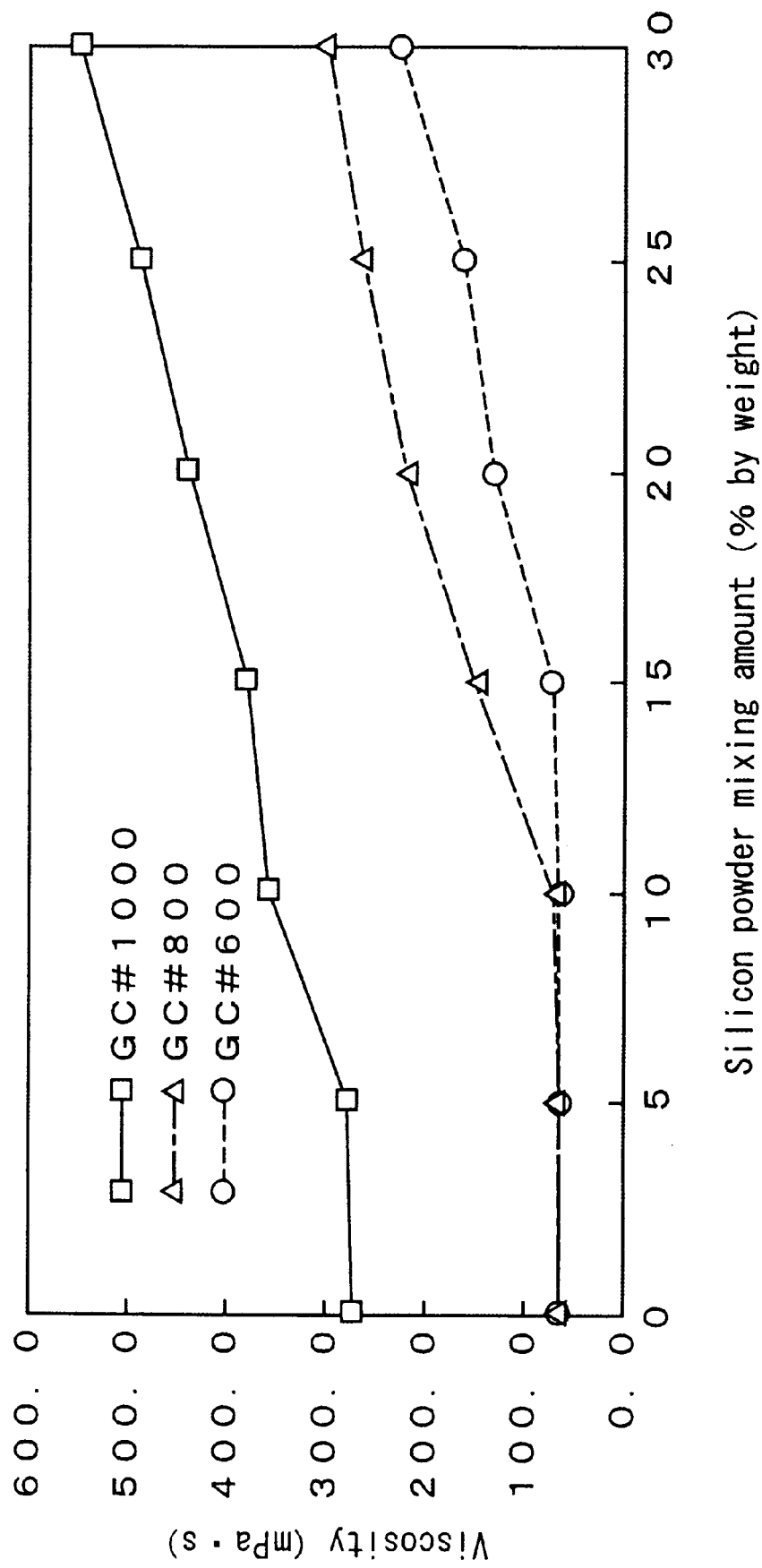

AQUEOUS COMPOSITIONS, AQUEOUS CUTTING FLUID USING THE SAME, METHOD FOR PREPARATION THEREOF, AND CUTTING METHOD USING THE CUTTING FLUID

TECHNICAL FIELD

The present invention relates to improvement on performance stability, safety and waste treatability of a cutting liquid used for generally cutting a work, concretely an ingot of semiconductor material such as silicon single crystal, silicon polycrystal, compound semiconductor or the like, or a ceramic block or the like; to a simple, easy producing process for the cutting liquid; and to a cutting method with high reliability and safety using the cutting liquid.

BACKGROUND ART

In general, when a work is cut using a cutting tool such as a wire saw, a band saw or the like, a cutting liquid has widely been used as a lubricant between the cutting tool and the work, to remove a friction heat therebetween and clean cutting chips away from the cutting tool and the work. For example, when wafers are produced by slicing an ingot of silicon single crystal as a work, a non-aqueous cutting liquid in a slurry state, which is prepared by dispersing loose abrasive grains of SiC (silicon carbide) or the like in a dispersion medium composed of a mineral oil and higher hydrocarbons as major components, has widely been used.

A wafer obtained by slicing has been cleaned with a low-priced chlorinated organic solvent with high detergency such as trichloroethane and dichloromethane.

In this way, in a system in which cutting is performed by dynamic contact among a cutting tool, a work and loose abrasive grains, to increase dispersibility of loose abrasive grains in a cutting liquid is important in order to keep the cutting ability at a constant level all time. As methods of increasing the dispersibility, there have been available two methods in a broad sense: (a) a method in which a dispersing agent is added in a dispersion medium and (b) a method in which a thickener is added in a dispersion medium.

The method (a) is to increase the dispersibility of abrasive grains themselves positively. Generally dispersibility of particles in a fluid is increased and a sedimentation speed of the particle is decreased, when individual particles each have a small mass, a sufficient repulsive force works between particles due to factors such as an electric double layer, or steric hindrance by absorbed molecules on a particle surface or the like and thereby the particles are existent as primary particles (particles in a non-aggregation state). Hence, an electrolyte or a surfactant having a lipophilic group such as an alkyl chain with a sufficient length has been added as a dispersing agent.

On the other hand, the method (b) is to increase a viscosity of a dispersion medium and thereby hinder Brownian movement of an abrasive grain in order to diminish a sedimentation speed. As a thickener, there has been known bentonite.

However, there are many problems to be solved for a nonaqueous cutting liquid.

First of all, organic solvents which have widely been known as a dispersion medium for a conventional nonaqueous cutting liquid are strong in smell and have inflammability according to a kind thereof. Hence the organic solvents have causes to deteriorate a working environment.

An intermediate product which has been obtained by cutting with a cutting oil, as described above, requires cleaning with an organic solvent capable of eliminating residue of the cutting oil on the product. However, since dichloroethane, for example, which has well been used in cleaning a semiconductor wafer is designated as a material to deplete the ozone layer by the Government, a usage quantity of the compound has to be decreased toward the perfect disuse state hereinafter, but economy and cleaning ability of alternatives are still short of target levels in the current state.

The method (a) in which a dispersing agent is added has a problem that precipitate is formed as a hard cake.

Abrasive grains which are increased in dispersibility by addition of a dispersing agent have, for certain, a slow sedimentation speed but are compressed under a load which exceeds a repulsive force while being put into close contact to each other in the course of sedimentation to form a hard cake. Once a hard cake is formed, it is hard to be again dispersed into a state same as the original one. Accordingly, if such a cutting liquid which has produced precipitate is tried to recycle after stirring for a long time, the cutting liquid in reuse as a result is in a state of a low concentration of abrasive grains, which decreases cutting ability. Besides, there also arise other problems that piping of a supply system of the cutting liquid is clogged, a tool for pulverization of a hard cake is worn at an earlier stage or the like.

If the mass of each of abrasive grains is large and a repulsive force therebetween is small, a problem of formation of a hard cake is eliminated. The reason why is that abrasive grains electrically bond each other with multivalent ions, which are mainly existent in the dispersion medium, interposed therebetween and as a result, multipored, soft flocculates are formed, so that relatively soft precipitate (soft cake) is formed over time. If the precipitate is of a soft cake, redispersion is easy to be effected.

However, since abrasive grains in a dispersion medium are hard to be kept in the primary particle state and in addition, a sedimentation speed of flocculates in the dispersion medium is fast, a distribution of abrasive grain concentration in the cutting liquid is apt to be uneven and thus cutting ability is easy to be unstable.

For this reason, a cutting liquid with high dispersibility is eventually forced to be employed and a cutting liquid which is hard to be recycled is collected after the use and generally incinerated for disposal. In this incineration, much of carbon dioxide caused by combustion of an organic solvent is released, which is not preferable from the viewpoint of prevention of global warming.

On the other hand, the method (b) in which a thickener is added has a guaranteed effect, on the assumption that a viscosity of a cutting liquid is unchanged, whereas the viscosity of a cutting liquid is actually changed due to a variety of factors.

A viscosity of a cutting liquid is generally increased if cutting chips are mixed into the liquid. Since abrasive grains cannot be supplied at a constant rate on a cutting surface of a work in a uniform manner as a viscosity increases, it is necessary for the cutting liquid to be replaced with a new one when a mixed amount of cutting chips is accumulated to 3 to 4% by weight of the total of the cutting liquid. This replacement increases a waste amount of the cutting liquid, which in turn increases an amount of carbon dioxide produced by incineration of the cutting liquid waste.

Viscosity of a nonaqueous cutting liquid is also increased as water is mixed into the liquid. Therefore, in order to prevent water from mixing, there has been a tight restriction imposed on a cleaning operation of wafers and a mounting base for ingots in a wire saw machine. That is, since a cleaning liquid has to be an organic solvent in a system in which a nonaqueous cutting liquid is employed, there is a requirement that cleaning is operated with an independent tank filled with a cleaning liquid, different from a cutting liquid tank. Hence, an installment area for cutting facilities is increased and besides, the usage amount of an organic solvent is also increased, which causes not only a working environment but a global environment to be further deteriorated.

To the contrary, when a molecular structure of a dispersing agent is broken through disconnection of an atomic bond in a molecule, viscosity of the nonaqueous cutting liquid is decreased and a cutting ability becomes unstable.

As described above, when a nonaqueous cutting liquid is employed, it is very difficult to establish compatibility between achievement of high dispersibility of abrasive grains which is required for maintenance of a cutting ability and prevention of a hard cake from forming which is required for improvement on recyclability of the cutting liquid and maintainability of the facilities, while suppressing an impact on a working environment and a global environment.

Therefore, the present invention, in order to solve the problems, has an object to propose a new aqueous composition which constitutes a base for an aqueous cutting liquid and provide an aqueous cutting liquid using the composition, producing processes for the composition and the cutting liquid and a cutting method using the cutting liquid.

DISCLOSURE OF INVENTION

An aqueous composition of the present invention is proposed in order to achieve the above described object, in which a polyhydric alcohol with a relatively low molecular weight, which is almost unharmful to human health and free of smell, and which is excellent in biodegradability and easy to be treated by an activated sludge process is used as a major dispersion medium, in which a quantity of water whereby it is made noninflammable is included, and in the dispersion medium of which a silicic acid colloid is dispersed in a stable manner. As a polyhydric alcohol described above, a hydrophilic polyhydric alcohol compound and a lipophilic polyhydric alcohol compound are simultaneously used.

An aqueous cutting liquid of the present invention is a disperse system which is prepared by adding abrasive grains to the aqueous composition so as to be dispersed together with a silicic acid colloid in a stable manner therein. When such an aqueous cutting liquid is used, not only can dispersibility of abrasive grains be improved, but since sedimentation of abrasive grains progresses while colloidal particles of a silicic acid are interposed between abrasive grains, the precipitate is not formed as a hard cake even in the course of sedimentation of the abrasive grains over time, and therefore the precipitate can again be dispersed with ease.

In order to produce such an aqueous composition of the present invention, a first liquid, which is a mixture of water, a hydrophilic polyhydric alcohol compound and a silicate, and in which a silicic acid is produced by a reaction, is prepared and the first liquid is mixed into a second liquid mainly composed of a lipophilic polyhydric alcohol compound, so that the silicic acid in a free state is stabilized as colloidal particles after the mixing.

In order to produce an aqueous cutting liquid, an aqueous composition obtained as described above, is added with abrasive grains. The aqueous cutting liquid is preferably used in cutting a work while the work and cutting means are kept in dynamic contact to each other.

BRIEF DESCRIPTION OF THE DRAWINGS

FIG. 6 is a graph showing an influence of a mixing quantity of silicon powder on a viscosity of an aqueous cutting liquid based on measurements by the VT04 type viscometer.

BEST MODE FOR PRACTICING THE INVENTION

Figure 1:
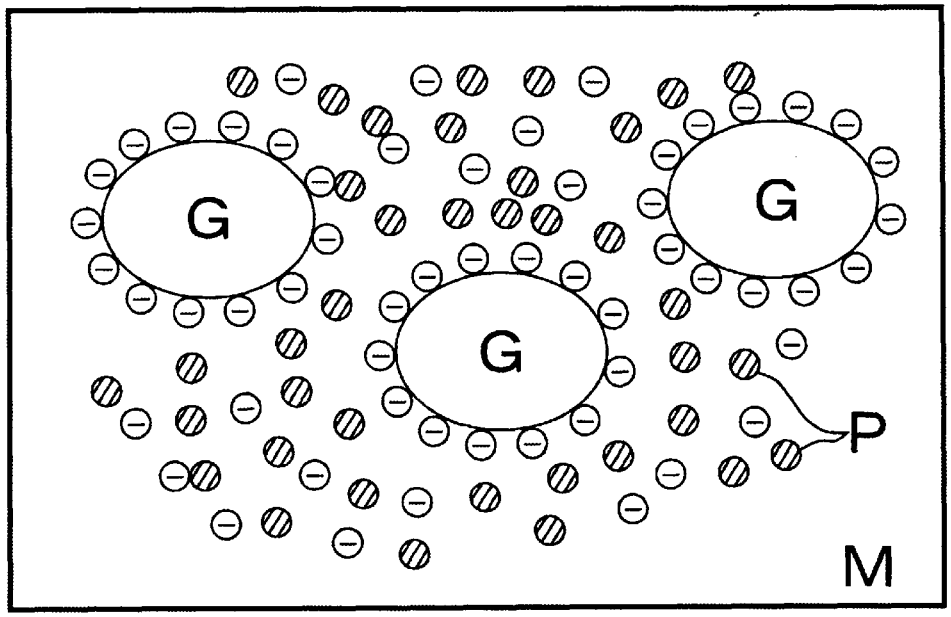
FIG. 1 is a representation as a model illustrating a dispersion state of abrasive grains in an aqueous cutting liquid of the present invention.

The present invention will further be described below. An aqueous composition of the present invention has as a dominating feature that silicic acid colloid particles in a dispersing medium are stabilized in an optimal balance between a hydrophilic polyhydric alcohol compound and a lipophilic polyhydric alcohol compound. A hydrophilic polyhydric alcohol compound of the present invention denotes any of a hydrophilic polyhydric alcohol and its derivatives. A lipophilic polyhydric alcohol compound of the present invention denotes any of a lipophilic polyhydric alcohol, and its derivatives or polymers of hydrophilic polyhydric alcohols.

A hydrophilic polyhydric alcohol compound plays a role as a catalyst whereby silicic acid is produced from a silicate. As an example, a process in which a metasilicic acid is produced from a potassium metasilicate by the action of ethylene glycol is shown in the following equation (i).

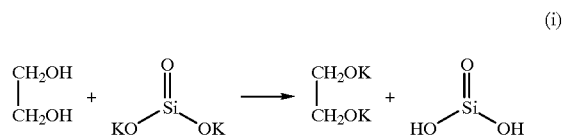

(i)

A potassium salt of ethylene glycol which is a byproduct is reproduced as ethylene glycol through ion exchange with water in the environs. The process is shown in the following equation (ii).

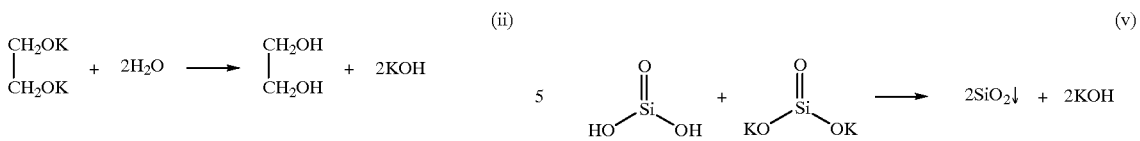

(ii)

A composition in which reaction products from the equations (i) and (ii) coexist show a gel-like appearance in the beginning, but as time elapses while being left, the gel state is gradually converted into a jelly state when water contents in compositions are very small. However, when a water content in a composition is large, the gel state is not converted into a jelly state. Judging from this phenomenon, formation of a jelly is considered to be caused by formation of disilicic acid or a higher polymer of silicic acid through dehydration/condensation. A producing process of disilicic acid is shown in the following equation (iii).

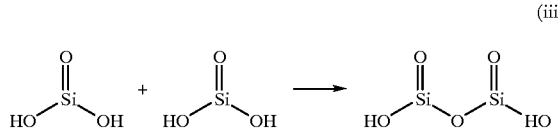

(iii)

When, for example, a composition is mixed with abrasive grains to prepare a cutting liquid for use, new abrasive grains cannot be supplied to a cutting surface in a smooth manner if the composition assumes a jelly state in this way, which decreases the cutting ability of the cutting liquid. Accordingly, it is required that the composition contains an amount of water. However, if water is too much, silicic acid colloid particles are perfectly ionized to be flocculated and precipitated, and cannot contribute to dispersion of abrasive grains.

In this situation, what plays a role to prevent conversion to the jelly state from occurring is a lipophilic polyhydric alcohol compound. By adding a proper amount of a lipophilic polyhydric alcohol compound into a dispersion medium, a solubility of the metasilicic acid in water is decreased and contribution to stabilization of colloidal particles of silicic acid is effected without any ionization of the particles.

At this point, part of the lipophilic polyhydric alcohol compound can be considered to work as a catalyst for production of metasilicic acid from potassium metasilicate in the same way as a hydrophilic polyhydric alcohol compound, but it is an ion exchange action by water in the environs that mainly produces metasilicic acid from potassium metasilicate in an environment strong in lipophilicity. This process is shown in the following equation (iv).

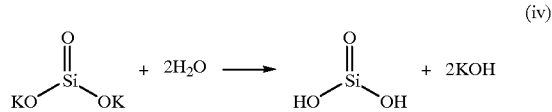

(iv)

However, if lipophilicity in the environs is too strong at this point, metasilicic acid and its potassium salt react with each other to form fine particles of silicon oxide. This process is shown in the following equation (v).

(v)

$$\underset{HO}{\overset{O}{\underset{\|}{Si}}}\underset{OH}{} + \underset{KO}{\overset{O}{\underset{\|}{Si}}}\underset{OK}{} \longrightarrow 2SiO_2\downarrow + 2KOH$$

That is, silicic acid which has once been produced cannot be retained with its form as produced but converted into silicon oxide ($SiO_2$) which is precipitated. Accordingly, in the present invention, a balance in content between a hydrophilic polyhydric alcohol compound and a lipophilic polyhydric alcohol compound is especially important. A content of a lipophilic polyhydric alcohol compound is preferably selected more than that of a hydrophilic polyhydric alcohol compound by a factor almost in the range of 2.5 to 20.0.

As a hydrophilic polyhydric alcohol compound used in the present invention, there can be named: ethylene glycol and glycerol, and ester derivatives and ether derivatives thereof. These compounds each are a compound almost with the number of carbon atoms of 2 to 6 in the principal chain and may be used singly or in combination.

As a lipophilic polyhydric alcohol compound used in the present invention, there can be named: propylene glycol, and an ester derivative and an ether derivative thereof. These compounds each are a compound almost with the number of carbon atoms of 2 to 6 in the principal chain and may be used singly or in combination.

The above compounds have no smell and are also of no harm to a human body.

Since the above compounds each have a comparatively small molecular weight and excellent in biodegradability, the compounds can sufficiently be decomposed even by activated sludge which is used in ordinary polluted water disposal facilities. Therefore, there are no anxieties about necessity for an incinerator and occurrence of carbon dioxide in company with operation of the incinerator.

A lipophilic polyhydric alcohol compound as described above may be a polymer such as a polyethylene glycol. However, when a polymer is used, it is required to be a liquid in room temperature and, for example, a polyethylene glycol with a degree of polymerization n=200 to 400 can be used. However, a waste treatment by activated sludge or adsorption of activated charcoal becomes hard to operate.

In an aqueous composition of the present invention, it is especially preferred that a water content in a dispersion medium is 5% by weight or more and less than 50% by weight. In other words, this means that the sum of contents of a hydrophilic polyhydric alcohol compound and a lipophilic polyhydric alcohol compound in a dispersion medium is set in the range of 50 to 95% by weight. When a water content is less than 5% by weight, there arise problems that a composition is converted into a jelly state or sufficient noninflammability and a proper cooling power cannot be provided. On the other hand, when a water content exceeds 50% by weight, all colloidal particles of silicic acid are ionized and flocculated and, for example, when the composition is added with abrasive grains and is used as an aqueous cutting liquid, dispersibility of abrasive grains is greatly reduced. That is, a water content is required to be selected so that it is short of perfect ionization of the colloidal particles of silicic acid, but sufficient to prevent silicic acid from gelation.

A more preferred range of a water content is 10% by weight or more and less than 40% by weight.

A content of a silicate in an aqueous composition of the present invention is preferably almost 0.1% by weight or more and less than 10.0% by weight. When a content is less than 0.1% by weight, a sufficient amount of colloidal particles of silicic acid is not produced and when a content is in excess of 10.0% by weight, the aqueous composition is easy to be converted to a jelly state by polymerization of free silicic acid molecules.

An aqueous composition of the present invention is preferably added with a carboxylic acid or its derivative as a pH adjuster. As a carboxylic acid, a carboxylic acid with an chelate effect and high biodegradability is preferred and there can be exemplified: lactic acid, citric acid, gluconic acid and malic acid. As a derivative thereof, an alkali metal salt can typically be used. A preferable pH range is in the range of 5.0 to 12.0.

When a pH is lower than 5.0, stable dispersibility of a silicic acid colloid which is produced cannot be attained and when a pH is higher than 12.0, a silicic colloid is soluble and cannot hold a colloidal state. In any case, dispersibility of abrasive grains is deteriorated when an aqueous composition is used as a base for an aqueous cutting liquid and therefore, it is hard to prevent a hard cake of sediment from being formed.

Besides, an aqueous composition may be added with fat and oil, a fatty acid or an ester as a lubricant according to a necessity. At this point, an additive amount of a lubricant is roughly limited to an amount up to 30.0% by weight.

Besides, in order to raise a lubrication effect by a lubricant, a surfactant may be added almost up to 15% by weight.

In order to produce such an aqueous composition of the present invention, a first liquid in which water, at least one of a hydrophilic polyhydric alcohol and its derivatives and a silicate are mixed is prepared. In the first liquid, silicic acid is produced from the silicate by a catalytic action of the hydrophilic polyhydric alcohol as shown in the above described equation (i).

Then, the first liquid is mixed with a second liquid including at least one of a lipophilic polyhydric alcohol and its derivatives as a major component.

When the above described aqueous composition is added with abrasive grains, an aqueous cutting liquid can be produced in which abrasive grains and a silicic acid colloid are both dispersed in a stable manner.

Abrasive grains are added into an aqueous composition in the range of 1.0 to 1.5 times that of the aqueous composition in weight. Abrasive grains are selected from the group consisting of corundum powder, emery, quartz sand, black silicon carbide, green silicon carbide, and the like, which are well known, according to a kind of application. Green silicon carbide is especially suitable for cutting of a semiconductor ingot.

An aqueous cutting liquid of the present invention can widely be applied to cutting methods for cutting a work through dynamic contact between the work and cutting means in the presence of the aqueous cutting liquid.

Especially, when an aqueous cutting liquid of the present invention is used in cutting a semiconductor ingot using cutting means such as a wire saw, a band saw or the like, a high precision cutting can be performed with ease. However, there is no specific limitation to the cutting means but a multiwire saw and a multiband saw, which are respectively composed of a plurality of wires and bands, and the like may be used; any of cutting means can be employed as far as cutting means uses loose abrasive grains.

Below, concrete examples of the present invention will be described.

EXAMPLE 1

In this example, preparation of an aqueous composition of the present invention will be described.

First, the first and second liquids described below were prepared.

| <The first liquid> | |
|---|---|
| purified water | 75.0% by weight |
| ethylene glycol | 8.5% by weight |
| potassium silicate | 16.5% by weight |
| <The second liquid> | |
| propylene glycol | 100% by weight |

Free silicic acid is produced in the first liquid.

Then, the first liquid (24.0% by weight) was added to the second liquid (75.0% by weight) at 25° C. In this step, by the presence of propylene glycol which is a lipophilic polyhydric alcohol and reduction in water content in a relative sense, free silicic acid already produced in the first liquid formed colloidal particles in a stable dispersion state.

Thereafter, citric acid (1.0% by weight) as a carboxylic acid for adjusting a pH value was added to the mixture so that a pH value was adjusted to be 6.5 and an aqueous composition was thus obtained.

Thus obtained aqueous composition was free of smell.

A water content of the above aqueous composition was finally 18.0% by weight and non-inflammable (boils at 123° C.). Major other properties were as follows: a viscosity of 17.5 mPa·s (a B type viscometer made by Tokyo Keiki Co.), a specific gravity of 1.049, a surface tension of 35.9 mN/m, a COD (chemical oxygen demand) of a 1% aqueous solution of 6700 mg/l and a coefficient of friction of 0.110.

The aqueous composition as thus prepared can be used with no additional adjustment, as a coolant for cutting by an inner diameter saw slicing machine, an outer diameter saw slicing machine and the like.

EXAMPLE 2

In the example, an aqueous cutting liquid was prepared by adding abrasive grains to the above described aqueous composition and its fundamental properties were studied.

First, a mixing ratio of the first and second liquids which are described in the example 1 was changed and thereby 8 kinds of aqueous compositions whose water contents were ranged from 13 to 48% by weight.

Then, three kinds of green silicon carbide with different grain sizes were mixed into each set of the eight kinds of aqueous compositions on a equal weight basis to prepare aqueous cutting liquids: the three kinds of green silicon carbide are GC#600 (average grain size of 20.0±1.5 μm), GC#800 (average grain size of 14.0±1.0 μm) and GC#1000 (average grain size of 11.5±1.0 μm) according to the nomenclature by JIS.

Theses aqueous cutting liquids were all free of smell and noninflammable.

Sedimentation speeds of the abrasive grains in the aqueous cutting liquids were slower as a water content was decreased, whereas the speeds were faster as a water content was increased. In any case of the aqueous cutting liquids, no hard cake of the abrasive grains was formed after sedimentation and deposition.

Here, terms are defined; a aqueous cutting liquid which has a nature that, when the cutting liquid is left stationary for 8 hours, an upper surface of a precipitate layer of the abrasive grains remains at a height 90% or more of that of the free surface of the cutting liquid, is called of a nonsedimentation type and a cutting aqueous liquid which has a nature that, when the cutting liquid is left stationary for 24 hours, an upper surface of a precipitate layer of the abrasive grains remains at a height 60% or less of that of the free surface of the cutting liquid, is called of a sedimentation type. An aqueous cutting liquid of the present invention has preferably an intermediate characteristic of the nonsedimentation and sedimentation types.

In order to attain such an intermediate characteristic, it has been found that a water content is preferably 30% by weight or less. In such an aqueous cutting liquid, an upper surface of a precipitate layer of the abrasive grains after being left stationary for an 8 hour remained at a height 80 to 90% of that of the free surface of the cutting liquid and an upper surface of a precipitate layer of the abrasive grains after being left stationary for a 24 hour remained at a height 65 to 75% of that of the free surface of the cutting liquid.

The reason why an aqueous cutting liquid of the present invention can retain a dispersion state of abrasive grains for a longer time than a conventional sedimentation type though an aqueous composition as a dispersion medium has a low viscosity is that the abrasive grains show an anionic property in the dispersion medium, while silicic acid colloidal particles are suspended in the dispersion medium in a state in which the surface of each of the silicic acid colloidal particles is also surrounded by a cloud made up of anionic ions (an electric double layer).

A state of this disperse system is shown in FIG. 1. In this system, there are repulsive forces (zeta potential) caused by electrical charges of one type between abrasive grains G with electrical charges caused by anions surrounding them; between silicic acid colloidal particles P suspended in the dispersion medium M; and between a abrasive grain G and a silicic acid colloidal particle P in the presence of anions produced by dissociation accompanied with ionization in the dispersion medium M and dispersion of abrasive grains G is thus accelerated.

Figure 2:
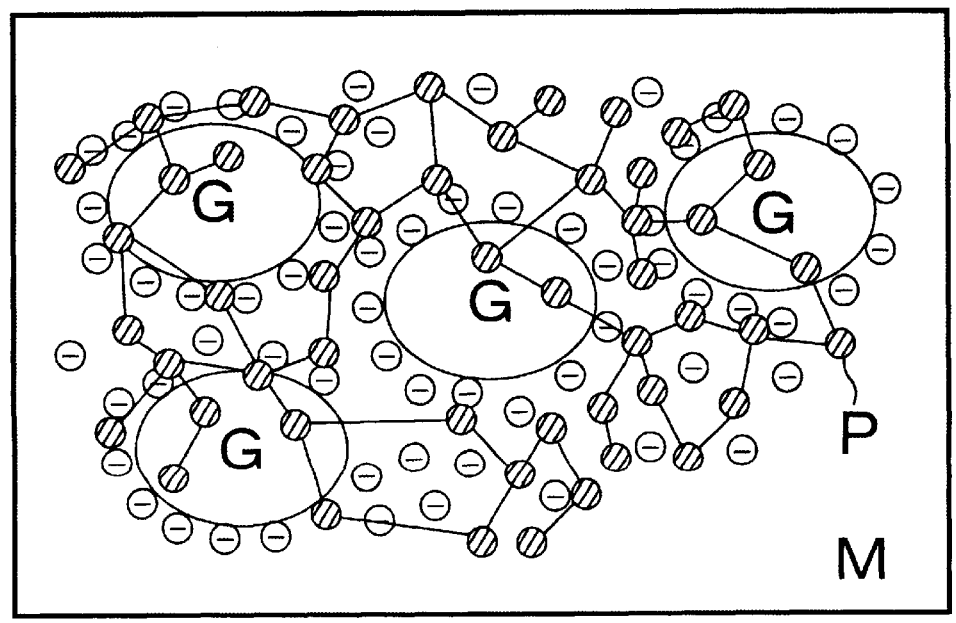
FIG. 2 is a representation as a model illustrating a sedimentation state of abrasive grains in an aqueous cutting liquid of the present invention.

These repulsive forces between electrical charges are retained to work in the precipitate. That is, adjacent silicic acid colloidal particles P exert repulsive forces, since a surface electrical charge density of each is large, so as to keep a distance therebetween all time, as shown in FIG. 2. Besides, the repulsive forces between electrical charges becomes conspicuous in reproducibility and sustainability by actions of physical stimuli such as flow, vibration or the like and a kind of spatial matrix structure is formed with silicic acid colloidal particles P in the precipitate. Abrasive grains are separately dispersed in an incorporated manner in the matrix.

However, since an aqueous cutting liquid of the present invention forms precipitate in a faster way than a conventional nonsedimentation type cutting liquid, the abrasive grains, in a practical aspect, can be recycled by solid-liquid separation through a natural sedimentation method. Therefore, there is a merit that a construction of an apparatus for solid-liquid separation is simple.

In addition, in the precipitate which is obtained as a result of keeping the aqueous cutting liquid stationary, abrasive grains G, as shown in FIG. 2, are not put into close contact to one another due to interposition of matrices of silicic acid colloidal particles P between the abrasive grains G and therefore, there are no chance to form a hard cake. Actually, even after the aqueous cutting liquid was left at room temperature for 7 days, precipitate was able to be again dispersed with ease.

Incidentally, in a conventional cutting liquid, it has been experienced that as the liquid is more excellent in abrasive grain dispersibility, formation of a hard cake is conspicuously more progressive. Besides, since the abrasive grains cannot be recovered by a natural sedimentation method with ease, centrifugation has been forced to be employed for separation. The centrifugation has been accompanied with a vicious cycle in which precipitate is coagulated to a more solidified state.

Then, viscosities of thus obtained aqueous cutting liquids were measured using two kinds of viscometers: a B type viscometer made by Tokyo Keiki Co. and a VT04 type viscometer made by Rion Co., Ltd. A B type viscometer obtains a viscosity of a sample liquid from measurement of a stress imposed on a disk type rotor which is rotated in the sample liquid and a VT04 viscometer measures a viscosity of a sample liquid from measurement of a stress imposed on a cylinder type rotor which is rotated in the sample liquid. There are differences between both in measurable range and precision due to differences in a gyration radius of a rotor, a shape thereof and revolution number thereof.

Figure 3:
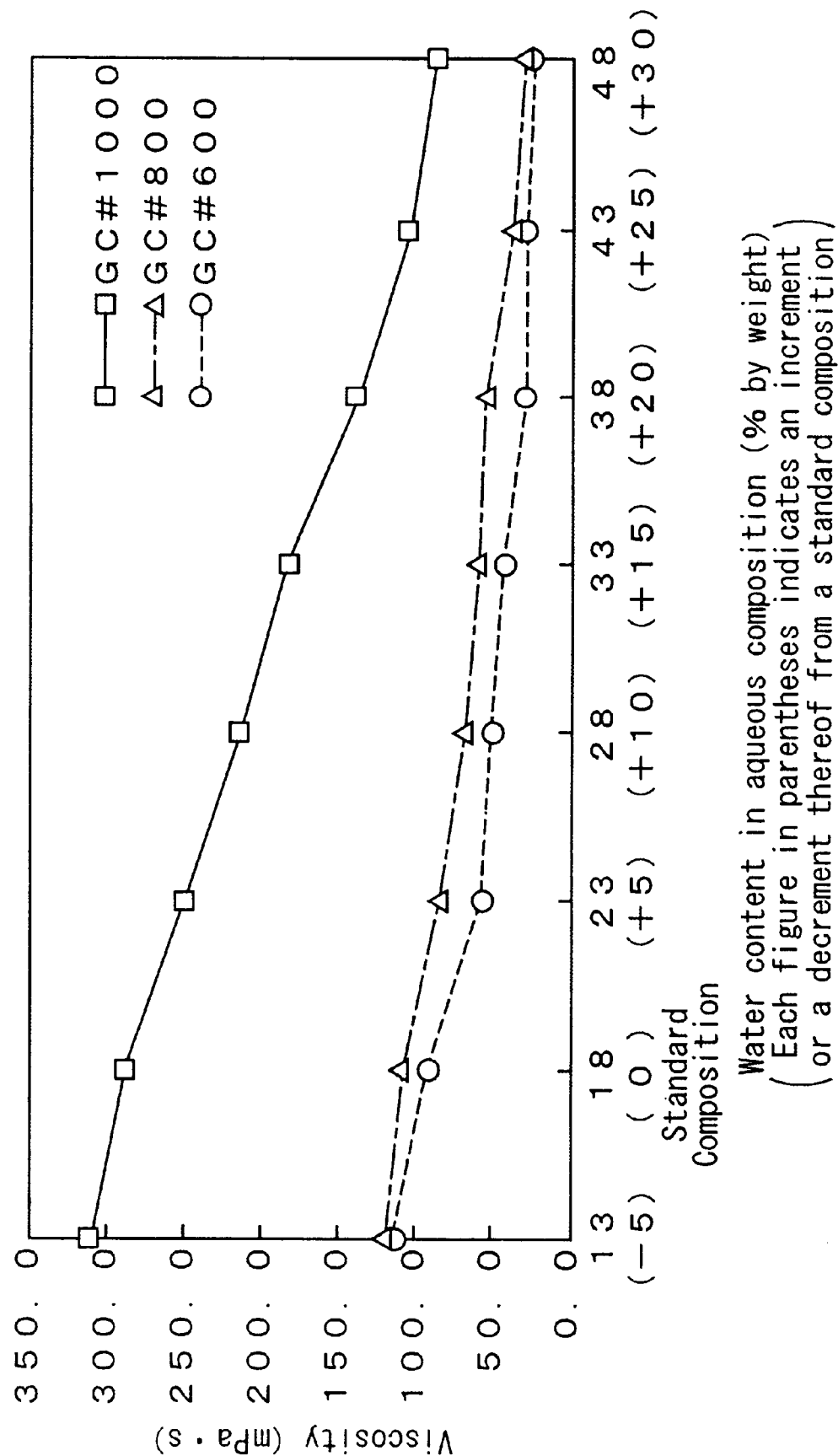
FIG. 3 is a graph showing an influence of a water content in an aqueous composition on a viscosity of an aqueous cutting liquid based on measurements by means of a B type viscometer.
Figure 4:
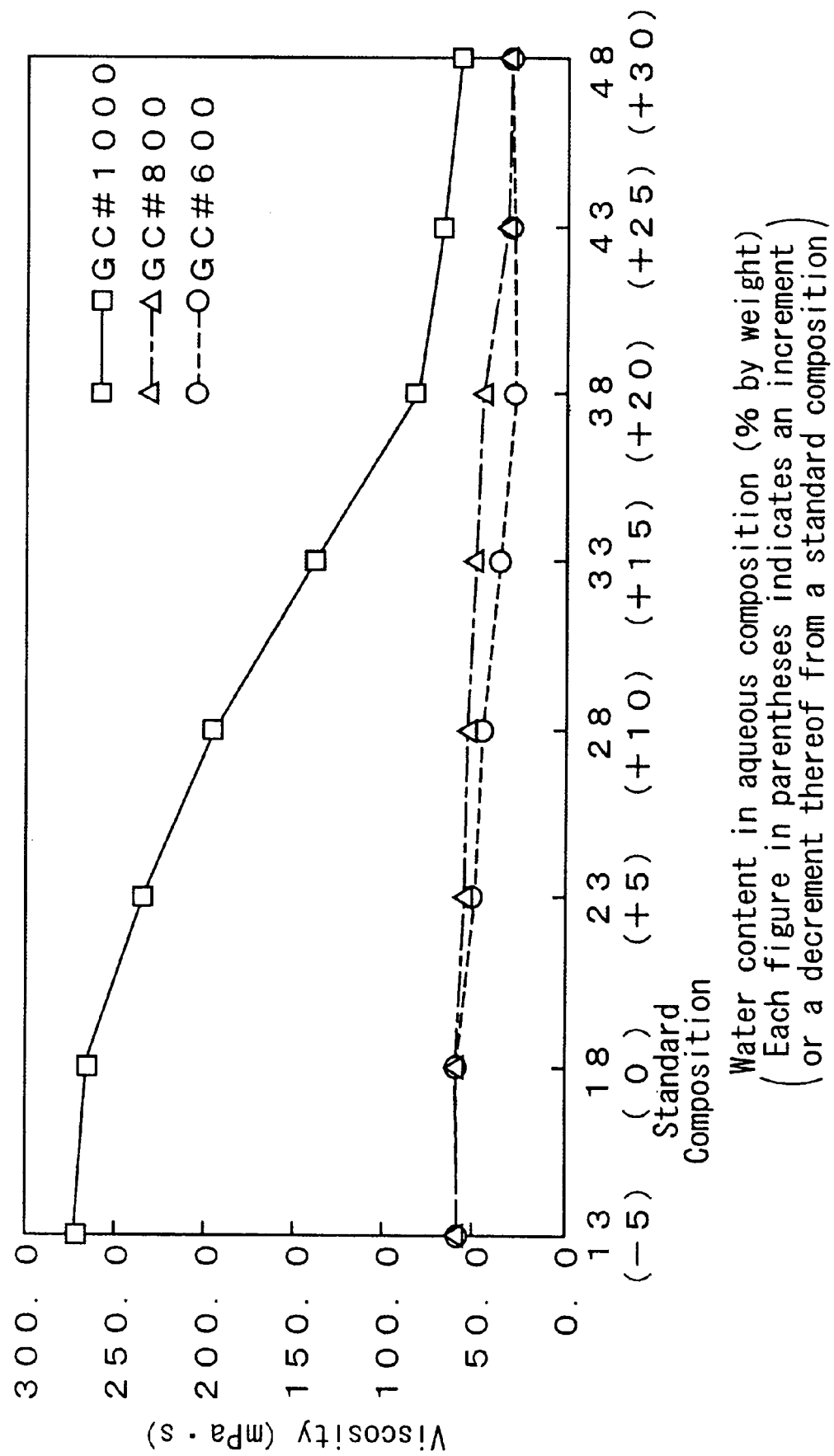
FIG. 4 is a graph showing an influence of a water content in an aqueous composition on a viscosity of an aqueous cutting liquid based on measurements by means of a VT04 type viscometer.

Measurement results by the B type viscometer and the VT04 are respectively shown in FIGS. 3 and 4.

The abscissas of the graphs are each assigned in two ways: a water content in % by weight of an aqueous composition and an increment or a decrement thereof from a standard composition. The term standard composition denotes an aqueous composition which is prepared in the example 1: a water content of 18.0% by weight.

On the other hand, the ordinates are each assigned to a viscosity in mPa·s.

In the graphs, a solid line indicates measurement results of an aqueous cutting liquid including GC#600, a single dot & dash line GC#800 and a broken line GC#1000.

As seen from the graphs, an aqueous cutting liquid of the present invention shows decrease in viscosity with increase in water content as a general trend, but a viscosity suitable for a practical use is still retained over the wide range of water contents. Especially, when abrasive grains with an average grain size of the order in the range of 20 to 10 μm are used, a viscosity can be retained on the order in the range of ⅓ to ¼ times the maximal viscosity value even if a water content is changed by a wide range up to 35% by weight.

It is very advantageous in a practical aspect such as in cutting of a semiconductor ingot that when abrasive grains with a comparatively small size as in the case of GC#1000 is used, stability of a viscosity, as described above, can also be obtained. When abrasive grains with a small grain size are used, a cutting speed is slow as compared with the case where large abrasive grains are used, but a kerf loss of a work can be decreased. Hence, such small abrasive grains are suitable for cutting an expensive material such as a semiconductor ingot. Therefore, stability improvement of a viscosity of a aqueous cutting liquid including small abrasive grains contributes to not only increase in and stabilization of a processing quality but improvement on economy. In addition, frequency of change of a cutting liquid is also decreased as a result.

That an aqueous cutting liquid of the present invention is hard to cause a change in viscosity according to a change in water content is also advantageous in the sense of enabling water cleaning of a cutting machine.

When a semiconductor ingot is cut by a wire saw using a nonaqueous cutting liquid, for example, cleaning operations of a wafer and a mount base for an ingot of a wire saw have heretofore had to be performed outside the body of the saw in order to avoid a rapid increase in viscosity of the nonaqeous cutting liquid caused by mixing of wafer thereinto.

However, if an aqueous cutting liquid of the present invention is used, a viscosity of the cutting liquid is retained near an original value in a stable manner, even when more or less of water is mixed thereinto and therefore, cleaning operations can be carried out within the wire saw machine, which enables great improvement of working efficiency and besides, decrease in floor space of the facilities to be realized.

EXAMPLE 3

In the example, a change in viscosity when silicon powder as a model of cutting chips is mixed into an aqueous cutting liquid of the present invention was investigated.

Aqueous cutting liquids in use were liquids which were prepared in such a manner that aqueous compositions each of a standard in which three kinds of abrasive grains: GC#600, GC#800 and GC#1000 were respectively included were added with silicon powder at proportions in the range of 0 to 30% by weight. The silicon powder was prepared by screening silicon powder obtained by pulverizing ordinary silicon wafers with a stainless filter of a mesh number 20, whose particle size through the mesh was 75 $\mu$m or less.

Figure 5:
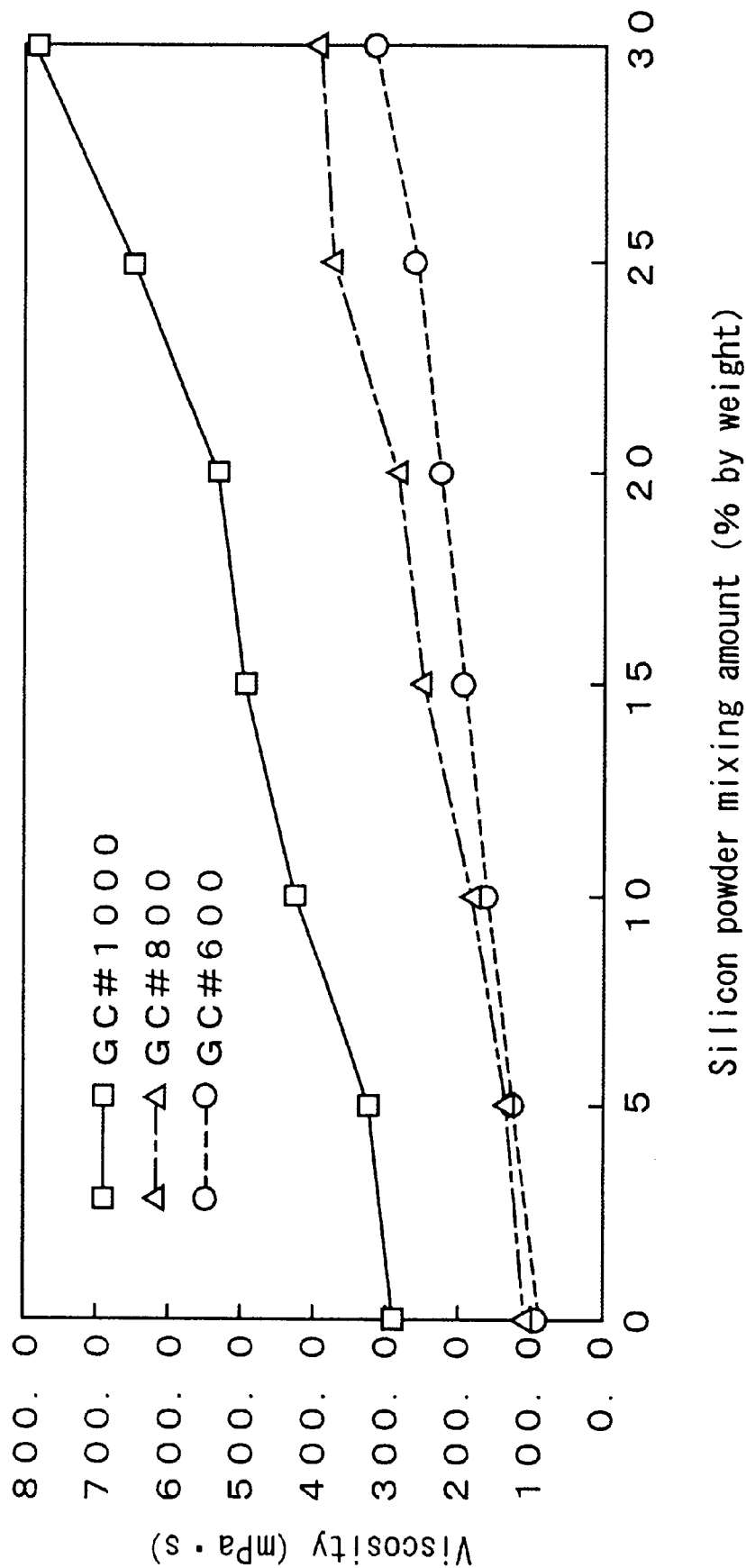
FIG. 5 is a graph showing an influence of a mixing quantity of silicon powder on a viscosity of an aqueous cutting liquid based on measurements by the B type viscometer.

Measurement results by the B type viscometer and the VT04 viscometer are respectively shown in FIGS. 5 and 6. The abscissas of the graphs are assigned to a silicon mixing amount in % by weight and the ordinates thereof are assigned to a viscosity in mPa·s. In the graphs, solid lines, single dot & chain lines and broken lines respectively indicate measurement results of aqueous cutting liquids including GC#600, GC#800 and GC#1000.

In a nonaqueous cutting liquid in the past, a viscosity was generally increased by a great margin as large as 150 to 200%, when cutting chips of a work were mixed thereinto to a proportion of 3 to 4% by weight. However, increase in a viscosity of an aqueous cutting liquid of the present invention is suppressed to a level of 70 to 130% as long as an amount of mixed water is up to 10 to 15% by weight, which, it has been found, enables the aqueous cutting liquid for practical use to be realized with no problem.

In the meantime, a viscosity of an aqueous cutting liquid whose viscosity is increased by mixing of cutting chips can again be decreased by adding purified water.

EXAMPLE 4

In the example, a silicon ingot was actually cut by a wire saw using an aqueous cutting liquid of the present invention and a cutting quality was evaluated.

First, an aqueous cutting liquid A described below was prepared.

| <Aqueous cutting liquid A> | |
| --- | --- |
| dispersing agent | the aqueous composition prepared in the example 1 |
| abrasive grains | GC #600, a weight equal to the dispersing agent |
| specific gravity | 1.5 to 1.6 |
| viscosity | 70 ± 10 mPa · s |

Then, the aqueous cutting liquid A was used and wafers were prepared by slicing a silicon ingot with a diameter of 8 inches and a length of 300 mm. Processing conditions were as follows:

| <Processing conditions A> | |
| --- | --- |
| wire | a music wire, a diameter of 180 $\mu$m |
| wire average linear speed | 500 m/min |
| average cutting speed | 500 $\mu$m/min |
| supply of a cutting liquid | 60 to 100 l/min |
| thickness of a wafer | 860 $\mu$m |
| kerf loss | 240 $\mu$m |
| pitch | 1100 $\mu$m |
| number of wafers | 272 pieces/ingot |

A bow, a wafer to wafer variation in center thickness and a taper were evaluated on obtained wafers.

In this case, the term bow means a quantity in $\mu$m which is defined as the sum of absolute values of maximal displacements in both ways on the plus side and the minus side which are calculated by using the least square method from measurements at points on a wafer surface with respect to a reference plane, while the wafer is left in a condition of no suction fixing.

The term taper means a quantity in $\mu$m which is defined as a difference between the maximum thickness and minimum thickness among five points comprised of one point 6 mm inside an orientation flat, three points located 6 mm inside the periphery being angularly spaced away from the one point along the periphery at an angle interval of 90 degrees about the center, and the center of a wafer. Results are compiled in Table 1.

| | Example 4 | Example 5 | Comparative Example 1 | Comparative Example 2 |
| --- | --- | --- | --- | --- |
| Bow ($\mu$m) | 15 | 20 | 20 | 30 |
| Variation of thickness ($\mu$m) | ±15 | ±10 | ±25 | ±20 |
| taper ($\mu$m) | 20 | 15 | 30 | 25 |

EXAMPLE 5

In the example, a silicon ingot was cut in the same way as in the example 4 with exception that the aqueous cutting liquid A of the example 4 was replaced with an aqueous cutting liquid B in which a grain size was smaller than that in the example 4.

Specifications of the aqueous cutting liquid B were as follows:

| <Aqueous cutting liquid B> | |
|---|---|
| dispersing agent | the aqueous cutting liquid used in the example 1 |
| abrasive grains | GC #800, a weight equal to the dispersing agent |
| specific gravity | 1.5 to 1.6 |
| viscosity | 80 ± 10 mPa · s |

Processing conditions were as follows:

| <Processing conditions B> | |
|---|---|
| wire | music wire, a diameter of 160 μm |
| wire average linear speed | 500 m/min |
| average cutting speed | 400 μm/min |
| supply of a cutting liquid | 60 to 100 l/min |
| thickness of a wafer | 860 μm |
| kerf loss | 202 μm |
| pitch | 1062 μm |
| number of wafers | 282 pieces/ingot |

Cutting qualities of thus obtained wafers are compiled in the table 1.

COMPARATIVE EXAMPLE 1

As a comparative example of the example 4, a silicon ingot was cut according to the processing conditions A using the following aqueous cutting liquid A instead of the aqueous cutting liquid A.

| <Nonaqueous cutting liquid A> | |
|---|---|
| dispersing agent | a mineral oil 98% by weight as a dispersing agent with a surfactant 2% by weight |
| abrasive grains | GC #600, a weight equal to the dispersing agent |
| specific gravity | 1.5 to 1.6 |
| viscosity | 150 ± 50 mPa · s |

Cutting qualities of thus obtained wafers are compiled in the table 1.

COMPARATIVE EXAMPLE 2

As a comparative example of the example 5, a silicon ingot was cut in the same conditions as the example 5 with the exception that the following nonaqueous cutting liquid B was used instead of the aqueous cutting liquid B.

| <Nonaqueous cutting liquid B> | |
|---|---|
| dispersing agent | same as the nonaqueous cutting liquid A |
| abrasive grains | GC #800, a weight equal to the dispersing agent |
| specific gravity | 1.5 to 1.6 |
| viscosity | 200 ± 50 mPa · s |

Cutting qualities of thus obtained wafers are compiled in the table 1.

When looking at the results of the examples 4, 5 and the comparative examples 1, 2, more stable performances are clearly obtained in the examples than in the comparative examples in any of the items of a bow, a thickness variation and a taper. This is because increases in viscosity of the aqueous cutting liquids caused by mixing of silicon cutting chips of the examples 4, 5 were less than that of the nonaqueous cutting liquids of the comparative examples 1, 2.

In the examples 4, 5, piping for cleaning water was laid down within the body of a wire saw machine, and wafers and an ingot mount base were able to be water-cleaned within the machine immediately after cutting. The reason why is that an aqueous cutting liquid of the present invention is less in increase in viscosity caused by mixing of water.

In this way, in the examples 4, 5, change frequency of a cutting liquid was decreased to ¼ to ⅕ times that of a conventional cutting liquid.

On the other hand, in the comparative examples 1, 2, wafers after the cutting were required to be cleaned with an organic solvent or an alkali solution outside the machine. In addition, there was an oil smell.

While the present invention is described based on the five examples, the present invention is not limited to the descriptions of the examples at all, but there are available various possibilities in regard to changes, selections and combinations, in a proper manner, of details of the examples such as components of an aqueous composition and their ratios, components of an aqueous cutting liquid and their ratios, kinds of work and processing conditions.

Industrial Applicability

As clearly understood from the above description, an aqueous composition of the present invention is constituted based on a totally new concept of a dispersion medium, which is comparatively of a low viscosity, and which is dispersed with silicic acid colloidal particles having a high dispersibility therein. The aqueous composition is aqueous and therefore does not show inflammablility. In addition, since a polyhydric alcohol compound which is included is free of smell, of a comparatively small molecular weight and excellent in biodegradability, a working environment is not deteriorated when the aqueous composition is used and no impact is given to a global environment when being wasted, either.

Since an aqueous cutting liquid of the present invention which is composed of an aqueous composition and abrasive grains dispersed therein is of a low viscosity in an intrinsic sense, a change in viscosity caused by mixing of water and cutting chips is mild and a long life time in performance as a cutting liquid can be enjoyed. Recovery of abrasive grains by a natural sedimentation method is possible. If a precipitate layer is formed as time elapses, the precipitate layer is prevented from being formed as a hard cake because of interposition of silicic acid colloidal particles. Hence, the precipitated abrasive grains can again be dispersed with ease. This is very preferable from the viewpoints of resource conservation and reduction in maintenance cost.

A producing process of an aqueous composition of the present invention is that water, a hydrophilic polyhydric alcohol compound and a silicate are mixed with one another to prepare a first liquid, while silicic acid is produced in a mixture, and then the mixture is further mixed into a second liquid mainly composed of a lipophilic polyhydric alcohol compound, so that silicic acid is stabilized as a colloid. Therefore, the aqueous composition can be produced with ease though any specific, large-scaled facilities are not required.

In addition, an aqueous cutting liquid can be produced with ease only by mixing abrasive grains into the aqueous composition.

Furthermore, according to a cutting method in which such an aqueous cutting liquid is employed, cutting can be performed with the resulted stable processing quality while frequency of change of the aqueous cutting liquid is decreased and thereby, economy, reliability and environment conservability in cutting operation can be improved.

What is claimed is:

1. An aqueous composition comprising a dispersion medium composed of a hydrophilic polyhydric alcohol compound, a lipophilic polyhydric alcohol compound and water, wherein silicic acid colloidal particles are dispersed in the dispersion medium.

2. An aqueous composition according to claim 1, wherein the hydrophilic polyhydric alcohol compound is ethylene glycol.

3. An aqueous composition according to claim 1, wherein the lipophilic polyhydric alcohol compound is propylene glycol.

4. An aqueous composition according to claim 1, wherein a water content in the dispersion medium is 5% by weight or more and less than 50% by weight.

5. An aqueous composition according to claim 1, wherein the dispersion medium includes at least one of a carboxylic acid and its derivatives.

6. An aqueous cutting liquid comprising a dispersion medium composed of a hydrophilic polyhydric alcohol compound, a lipophilic polyhydric alcohol compound and water, wherein abrasive grains are dispersed in the dispersion medium together with silicic acid colloidal particles.

7. A producing process for an aqueous composition comprising the steps of: preparing a first liquid by mixing water, a hydrophilic polyhydric alcohol compound and a silicate in which silicic acid is produced by the mixing; and mixing the first liquid with a second liquid including a lipophilic polyhydric alcohol compound as a major component, so that silicic acid are dispersed as colloidal particles in a stable manner in a resulted mixture.

8. A producing process for an aqueous cutting liquid comprising the steps of: preparing a first liquid by mixing water, a hydrophilic polyhydric alcohol compound and a silicate in which silicic acid is produced by the mixing; mixing the first liquid with a second liquid including a lipophilic polyhydric alcohol compound as a major component to produce an aqueous composition in which silicic acid are dispersed as colloidal particles in a stable manner; and mixing abrasive grains into the aqueous composition to disperse therein.

9. A cutting method in which a work is cut by making the work and cutting means kept in dynamic contact to each other in the presence of an aqueous cutting liquid, wherein the aqueous cutting liquid in use is prepared by dispersing both of abrasive grains and colloidal particles of silicic acid in a dispersion medium including a hydrophilic polyhydric alcohol compound, a lipophilic polyhydric alcohol compound and water.

10. A cutting method according to claim 9, wherein a semiconductor ingot is cut as the work.

* * * * *